United States Patent

Niss

[19]

[11] Patent Number: 5,934,509
[45] Date of Patent: Aug. 10, 1999

[54] DISPENSING DEVICE FOR FLOWING SUBSTANCES AND A SUSPENSION DEVICE FOR CONTAINERS INTENDED FOR FLOWING SUBSTANCES

[75] Inventor: Jan-Anders Niss, Malung, Sweden

[73] Assignee: JanA System AB, Malung, Sweden

[21] Appl. No.: 08/722,185

[22] PCT Filed: Apr. 19, 1994

[86] PCT No.: PCT/SE94/00317

§ 371 Date: Oct. 11, 1996

§ 102(e) Date: Oct. 11, 1996

[87] PCT Pub. No.: WO95/27424

PCT Pub. Date: Oct. 19, 1995

[51] Int. Cl.$^6$ .......................................... B67D 5/00
[52] U.S. Cl. .................. 222/83; 222/81; 222/91
[58] Field of Search .................. 222/81, 83, 91

[56] References Cited

U.S. PATENT DOCUMENTS 3,847,304  11/1974  Cohen ..................... 222/105
5,111,970   5/1992  Rutter et al. .............. 222/83

FOREIGN PATENT DOCUMENTS 2142623    3/1973  Germany .
2603353    8/1977  Germany .
9202983    4/1994  Sweden .
WO93/14679 8/1993  WIPO .

*Primary Examiner*—Andres Kashnikow
*Assistant Examiner*—David Deal
*Attorney, Agent, or Firm*—Jacobson, Price, Holman & Stern, PLLC

[57] ABSTRACT

A device for dispensing flowing substances comprises a container (3), a valve arrangement and a conduit extending therebetween, said conduit (6) comprising, at its end (30) intended for connection to the container (3), a cutting member (31) adapted to cut through a closure (32) arranged on the container. A sleeve (37) attachable to the container comprises at least one internal and annular sealing member (55) adapted to seal against the exterior of a tubular portion (36), which extends through the sleeve and at one end of which the cutting member is arranged.

4 Claims, 6 Drawing Sheets

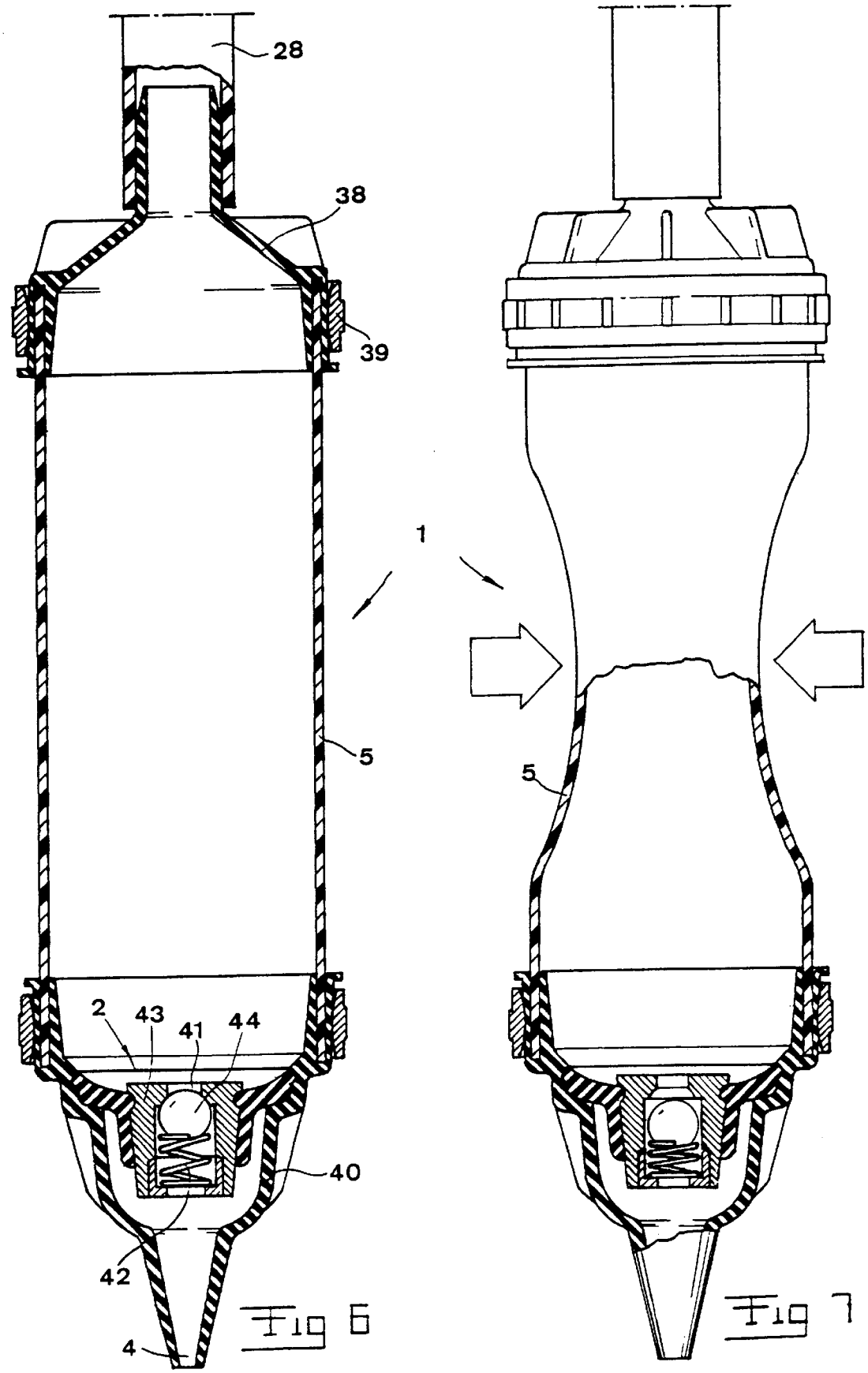

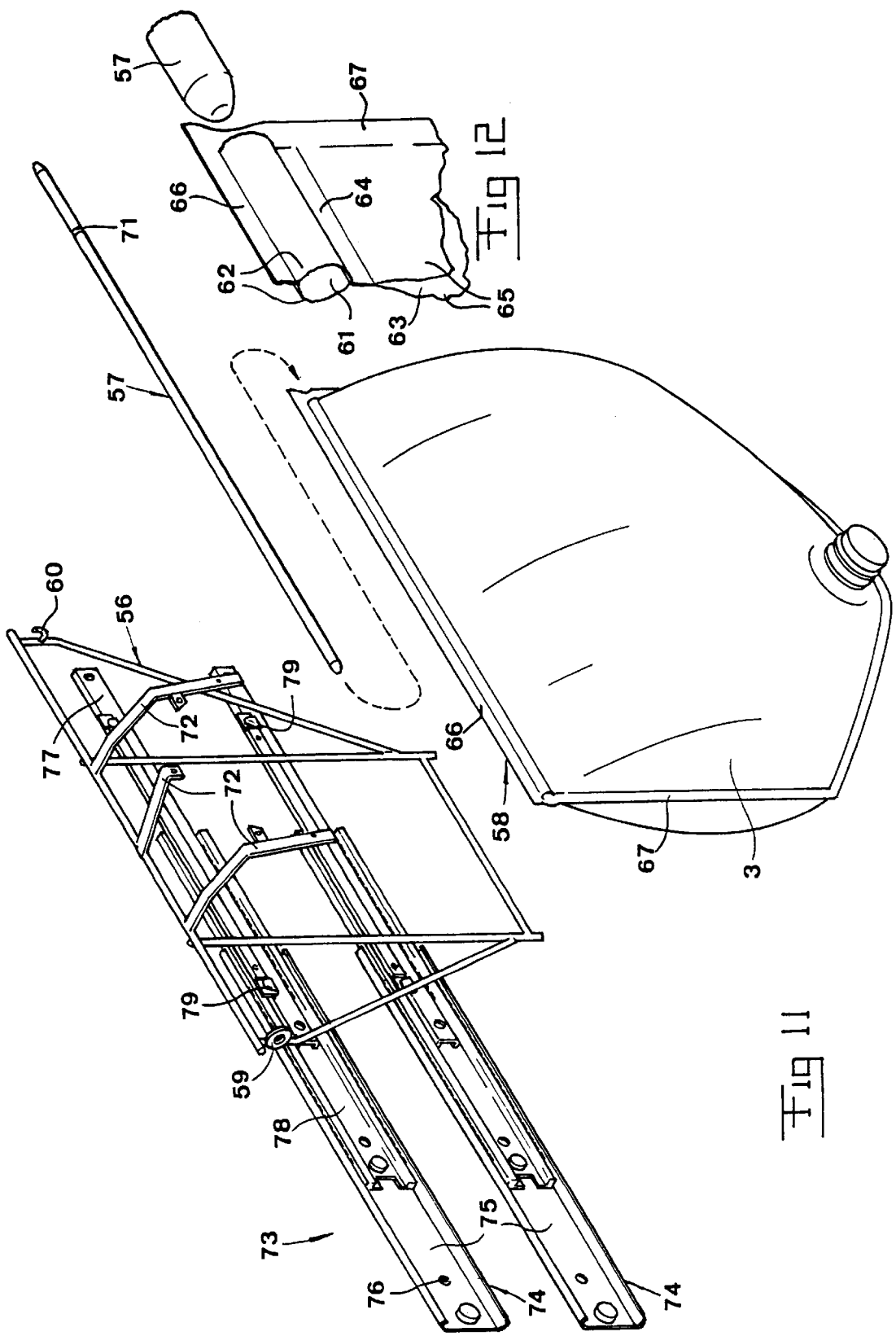

DISPENSING DEVICE FOR FLOWING SUBSTANCES AND A SUSPENSION DEVICE FOR CONTAINERS INTENDED FOR FLOWING SUBSTANCES

FIELD OF THE INVENTION AND PRIOR ART

This invention is primarily related to a device for suspending bag-like containers adapted for flowing substances on a carrier. Flowing food substances are primarily intended, such as mustard, ketchup, dressings, etcetera, within the restaurant and fast food business, cream, butter cream, jellies and the like within the bakery art etcetera. The term "flowing" includes, of course, such substances which are liquid but also such substances which occur in the form of a powder, granulate or similar.

Advantages are associated to provision of the substances in question in containers of the kind which decrease their volume in the same pace as the substance is discharged from the container. This does not require any air communicating connection between the interior of the bag and the ambient atmosphere and, accordingly, it is avoided that the substance in the container is exposed to contact with ambient air. This means that the food substance may remain in the container for a very long time without being degraded. It is in this connection preferred that the container has the character of a flexible bag, which with exception of one single discharge opening is entirely closed relative to the surroundings.

The present invention deals primarily with providing possibilities to efficiently suspend this type of bag-like containers, the suspension technique being such that the container may obtain a rather uncomplicated design at the same time as the suspension should be such that discharge of the substance from the container is not affected negatively.

According to a secondary aspect of the invention, a device for dispensing flowing substances is provided, said device comprising a container, a valve arrangement and a conduit extending therebetween, in such a way that the conduit in a simple, rational and tight manner may be brought into communication with the interior of the container.

SUMMARY OF THE INVENTION

In accordance with the first aspect of the invention, the object posed is fulfilled by the device comprising a carrying member adapted to carryingly engage with an upper edge portion of the container in such a manner that the carrying forces are applied relatively evenly distributed along this upper edge portion of the container and by the container comprising means for supporting the carrying member. In this way it is achieved that the bag-like container will be suspended in a controlled manner, without the container being, at least locally, deformed and possibly destructed, which could be the case when a point like suspension technique by means of hooks or the like were applied.

According to the second aspect of the invention the object posed is achieved by the conduit comprising, at its end intended for connection to the container, a cutting member adapted to cut through a closure arranged on the container and by a sleeve attachable to the container comprising at least one internal and annular sealing member adapted to seal against the exterior of a tubular portion, which extends through the sleeve, and at one end of which the cutting member is arranged. In this way an easily producable and tight coupling of the conduit and the container is obtained in such a manner that the content of the container to a minimum or no extent will enter into communication with the ambient air.

Further preferable features and advantages of the invention appear from the independent claims and from the following description.

SHORT DESCRIPTION OF THE DRAWINGS

With reference to the enclosed drawings a more specific description of embodiment examples of the invention follows hereunder.

In the drawings;

FIG. 6 is a partially cut side view of a dispensing unit contained in the dispensing device and comprising a tube produced from a flexible material;

FIG. 7 is a view similar to FIG. 6 but illustrating the tube compressed;

FIG. 11 is a perspective exploded view illustrating the container and the carrier intended therefor; and FIG. 12 is an enlarged detail view of the container illustrated in FIG. 11.

DETAILED DESCRIPTION OF PREFERRED EMBODIMENTS

Figure 1:
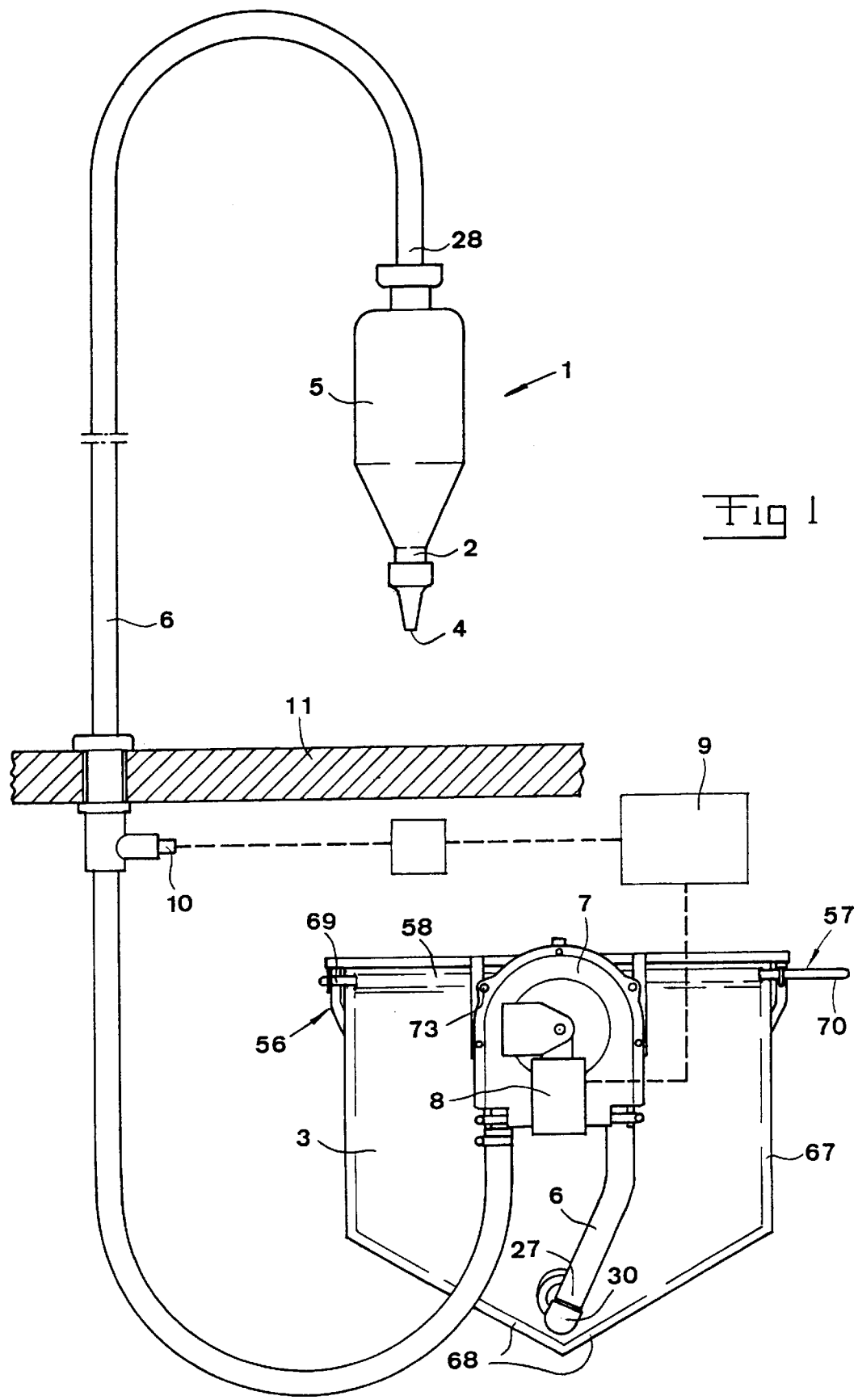
FIG. 1 is a diagrammatical overall view of the dispensing device according to the invention.

In FIG. 1 there is illustrated diagrammatically a device for dispensing flowing substances, in particular food substances, such as mustard, ketchup etcetera, comprising a dispensing unit 1 having a valve arrangement 2 for regulating flow of substance from a container 3 out through a discharge opening 4.

The container 3 is of the type which decreases its volume in the same pace as the substance is discharged from the container in order to avoid the substance in the container getting into contact with air, and in particular ambient air. A preferred embodiment of the container 3 is as a flexible bag. Accordingly, the container 3 is presumed to be filled with substance on delivery from a factory without existence of any air filled proportion of the space in the container. As the substance exits the container it reduces its volume so that the container in an emptied state is substantially flat.

The device comprises a tube 5 produced from a flexible material and intended to receive substance arriving from the container 3. The valve arrangement 2 is adapted to be actuated for flow regulation by pressure influence on the flexible tube 5. This pressure influence is primarily intended to be manual, i.e. that the operator of the device grips the tube 5 with the hand and compresses the tube more or less in dependence upon the amount of substance the operator wants to dispense.

A conduit 6 extends between the valve arrangement 2 and the container 3. This conduit is co-ordinated with a pump arrangement 7 adapted to convey the substance in the conduit without getting into direct contact with the substance. The pump arrangement is driven by a motor 8, the operation of which is controlled by a control unit 9, which carries out the control of the motor 8 in dependence upon information received from a pressure sensor 10 and corresponding to the pressure of the substance in the conduit 6. More specifically, the function is such that the control unit 9 controls the motor 8 to interruption of the pumping effect of the pump arrangement 7 at a certain pressure level of the substance in the conduit established by the pressure sensor 10, whereas the control unit 9 starts the pump arrangement when the pressure is below a certain level. Thus, this means that a substantially constant over pressure will exist downstream of the pump arrangement 7, whereas the pressure upstream of the pump arrangement 7 depends on whether the latter in practice will suck substance from the container 3 or the container is orientated in such a manner relative to the pumping arrangement 7 that the substance tends to automatically arrive to the pump arrangement under the influence of gravity.

The valve arrangement 2 is adapted to close against flow of substance from the tube 5 when this is exteriorly uneffected, but to open when the tube 5 is pressure affected from the exterior with a force above a certain threshold value. In other words, the valve arrangement should, when the tube 5 is uninfluenced by the operator, be capable of closing such that the over pressure existing in the conduit 6 between the valve arrangement and the pump arrangement does not cause any flow of substance through the discharge opening 4. An additional pressure obtained by the operator pressing the tube 5 together should, however, give rise to an increase of the pressure in the conduit 6 to such an extent that the valve opening 2 opens. In this connection it is pointed out that the pump arrangement 7 should be of such a type that a pressure increase occurring in the conduit 6 as a consequence of compression of the tube 5 cannot involve flow of the substance through the pump arrangement 7 in the backwards direction towards the container 3.

In the case according to FIG. 1 the conduit 6 is intended to extend from the container 3 to the dispensing unit 1 while passing through an opening in a work desk plate 11. This is more clearly illustrated in FIG. 2, from which also appears that a clamping coupling generally denoted 12 is arranged to clamp the conduit 6 relative to the plate 11 for avoiding the conduit 6 from sliding back and forth in relation to the plate 11. This one can be constituted by a bench top or the like in a restaurant, a kiosk or similar. The clamping coupling 12 comprises two parts 13, 14 co-operating with each other and shaped for, on one hand, being locked tight in relation to the plate 11 and, on the other hand, effect a clamping member 15, for example a rubber ring, to be pressed against the tube 6 located on the inside thereof for fixing of position. In the example, the parts 13, 14 are thought to present threads co-operating with each other so that the parts can be brought to be locked together in relation to the plate 11 by screwing, and, at the same time, the rubber ring 15 is deformed to clamp against the conduit 6. The latter extends through a passage commonly formed by the parts 13, 14.

Figure 2:
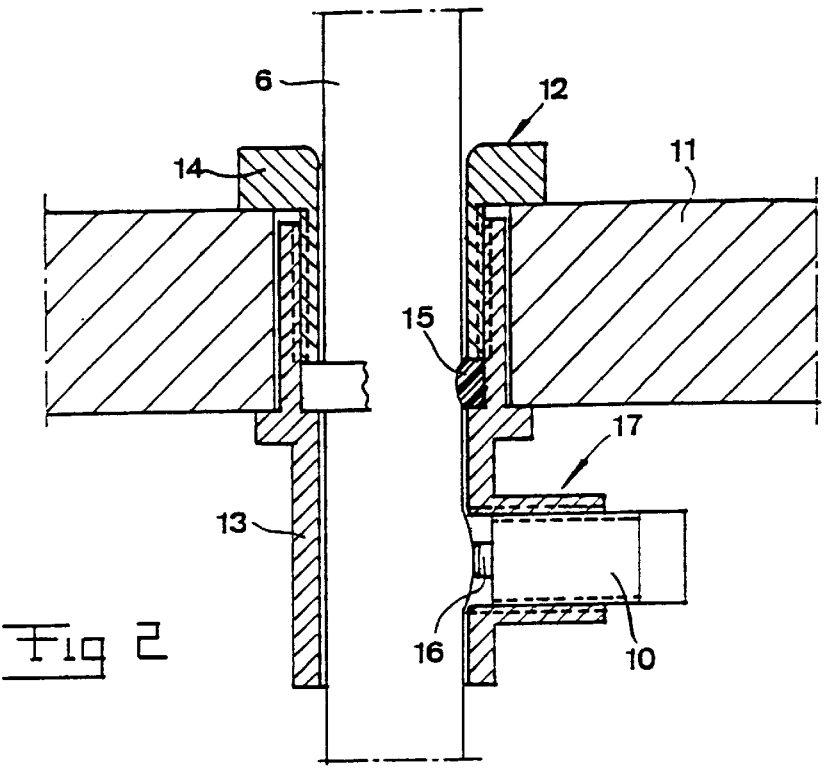
FIG. 2 is a partially cut detail view illustrating a conduit lead-through and a pressure sensor.

In FIG. 2 the pressure sensor 10 is also illustrated. This comprises a sensing member arranged to be affected by width changes of the conduit 6 depending on the pressure within the conduit. This prerequisites that the conduit 6 to at least a part is flexible or hose like and enough deformable concerning width, so that pressure changes occurring shall give rise to width changes sensible by relatively uncomplicated sensing members. Hence it follows that the pressure sensor 10 only senses the pressure indirectly, i.e. that the pressure sensor 10 is not in any direct contact with the substance in the conduit 6 but with the outer mantle surface of the conduit. The pressure sensor 10 is to be arranged in a cavity in a suitable holder 17 and the conduit 6 extends past this cavity so that the conduit at pressure increase in the same can expand more or less into this cavity and thereby affect the sensing member 16.

Although, of course, the pressure sensor 10 can be arranged totally separated from the clamping coupling 12, FIG. 2 shows that a possible embodiment is to integrate the holder 17 with the clamping coupling 12, in the example with the lower part 13 of the latter.

Figure 3:
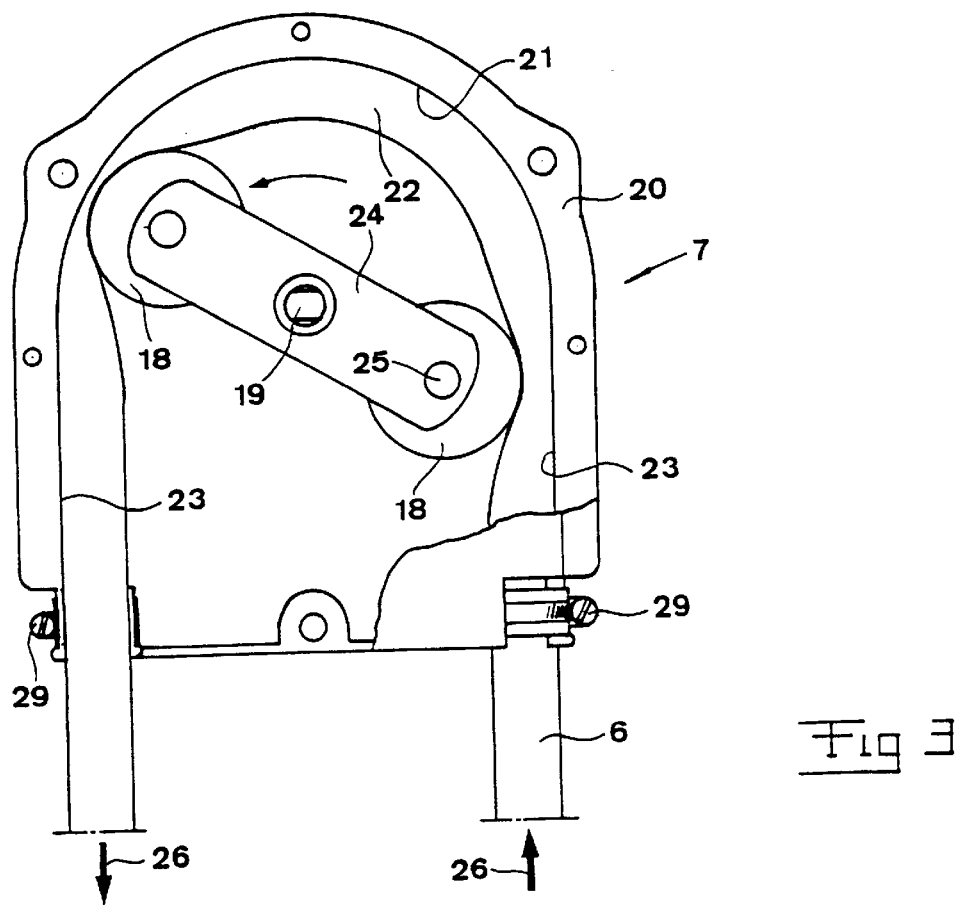
FIG. 3 is a diagrammatical view of a pump arrangement included in the device.

The pump arrangement 7 is more closely illustrated in FIG. 3 together with a part of the conduit 6. At least the part of the conduit illustrated in FIG. 3 is designed like a hose and this hose part forms part of the pump arrangement 7 by comprising one or more pump members 18, which are arranged so as to be moved along a portion of the hose during pressure action against the same. In the example that hose portion extends in the form of an arc and the pump members 18 are rotatably arranged around an axle 19, which substantially forms the centre for the arc of the hose portion.

The pump arrangement 7 comprises a housing 20 which is formed by two housing halves fastened to each other, only one of which is shown in FIG. 3. The housing 20 forms interiorly a support surface 21 formed as a circle arc, for the hose portion 22. The support surface 21 is suitably generally semi-circular and merges into tangentially directed support surface parts 23. The pump members 18 are arranged on a carrier 24, which is driven in rotation around the axle 19. The pump members 18 suitably have the character of rollers or pulleys, which are rotationally arranged around axles 25 on the carrier 24.

When the carrier 24 rotates, the pump members 18 will, in the area of one of the tangential support surface parts 23, get in contact, in a successive way, with the hose portion 22, so that the hose portion is squeezed together. Continued rotation of the carrier 24 in the direction of the arrow in FIG. 3 means that the place for squeezing together of the hose will be displaced forwardly so that the substance existing in the hose at the same time also will be displaced forwardly. At the same time the hose once again expands behind the place of squeezing together, so that the result becomes a transport of the substance in the direction of the arrows 26.

It should be noted that it, in the embodiment illustrated, is of importance that the number of pump members 18 is so large, in practice at least two, that when one of the pump members gets out of the squeezing engagement with the hose portion 22, the other pump member shall already have gone into squeezing co-operation with the hose portion, i.e. that independently of the position of the pump members 18 there shall never be present any free passage backwardly past the pump arrangement 7 in a direction towards the container 3. This also means a relatively stable holding of pressure downstream of the pump arrangement 7.

It is preferred that the conduit 6 is in one single material piece, preferably one single continues hose piece, all the way from an end portion 27 which is intended for being connected to the container 3 to the opposite end portion 28 which is intended for connection to the dispensing unit 1. However, it is also conceivable to arrange, in a manner well known per se, tight joints in the conduit 6, so that the conduit portion located in the pump arrangement 7 easily can be replaced; since the hose portion in the pump arrangement 7 is subjected to mechanical influence, this portion will have to be replaced before other portions of the conduit 6. The hose portion, which is subjected to influence in the pump arrangement 7, is intended to be fixed relative to the housing 20 by means of suitable clamps 29.

Figure 4:
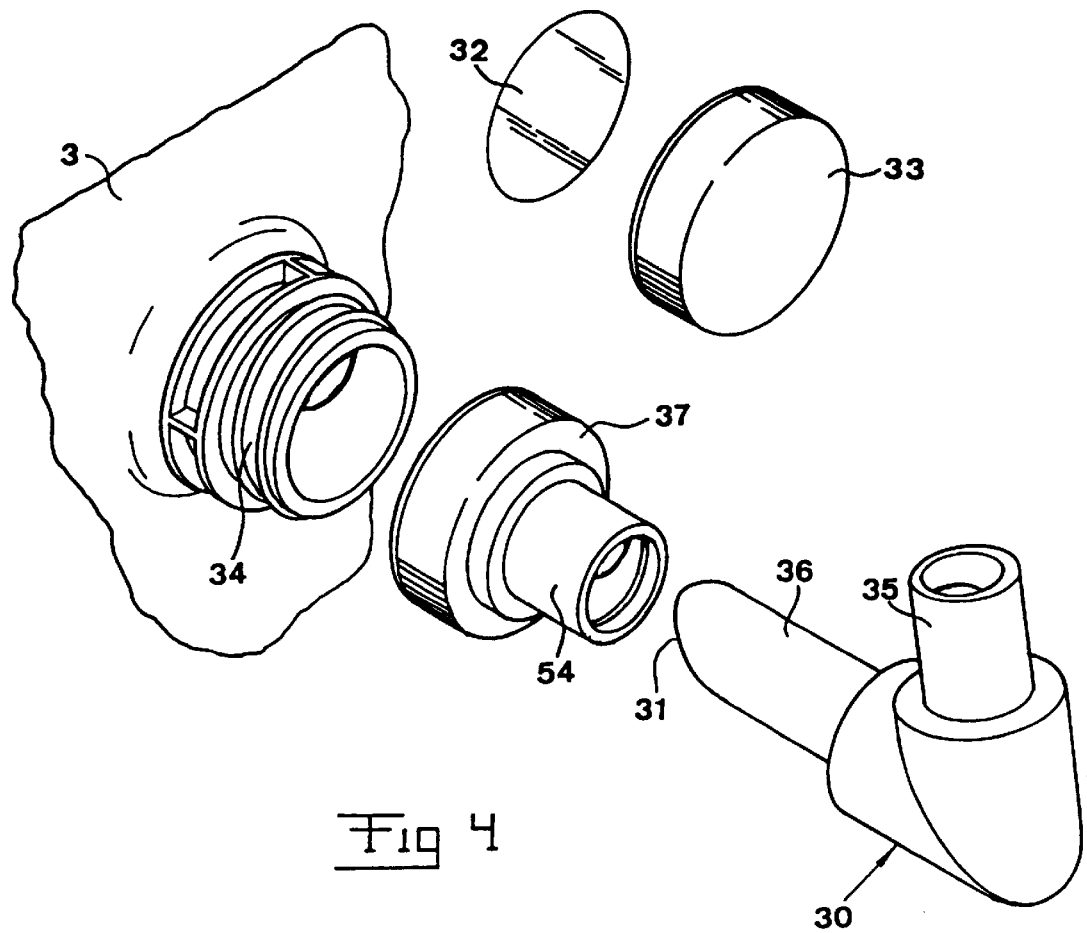
FIG. 4 is a perspective exploded view of a part of a container and a conduit intended for connection thereto.
Figure 5:
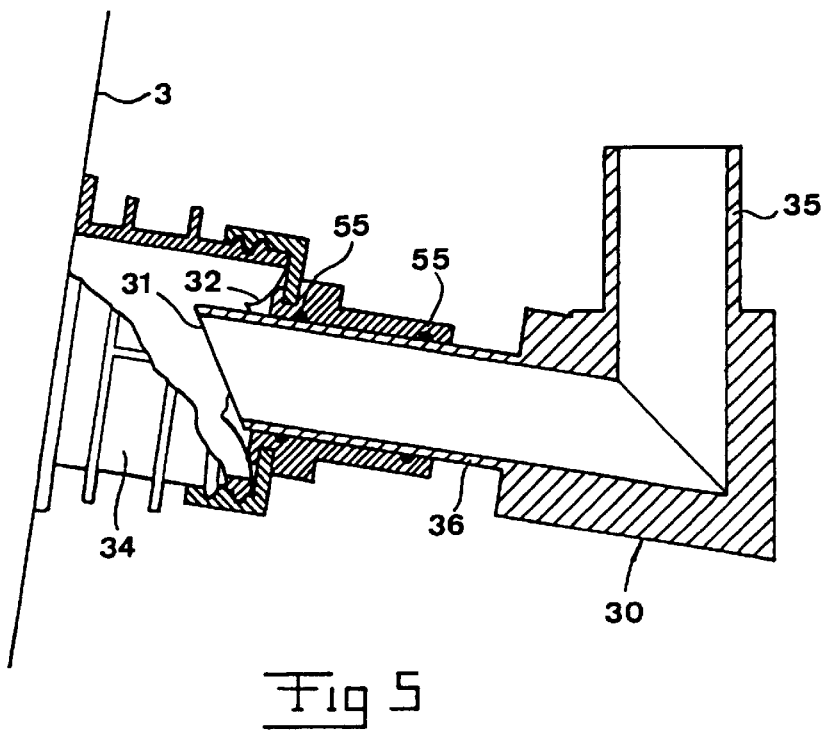
FIG. 5 is a partially cut side view illustrating the conduit and the container in FIG. 4 assembled.

At its end 27 (FIG. 1) intended for connection to the container 3, the conduit 6 presents a connecting element 30, which forms part of the conduit and which is more closely illustrated in FIGS. 4 and 5. This connection element comprises a cutting member 31 adapted to cut through a closure 32 arranged on the container 3. This closure has the purpose to keep the substance present in the container hermetically separated from the ambient atmosphere after filling of the container for the purpose of avoiding decomposition of the substance. During transport and storage, the closure 32 is protected by a cover 33 placed on the connection tube piece 34 which is designed in one piece with the container 3. The closure 32 is intended to be located across the mouth of the tube piece 34 in connection with production and/or filling of the container 3. The connection element 30 comprises a tubular section 35 intended for connection to the conduit 6 and a further tubular portion 36, at the outer end of which the cutting member 31 is arranged.

As appears from FIGS. 4 and 5, the device comprises an intermediate part 37 which is applicable to the container. More specifically, the intermediate part may comprise an internally threaded mantle adapted to engage with an external thread on the connecting tube piece 34 of the container. The intermediate part 37 comprises, furthermore, a tube piece 54, which defines an internal passage for receiving the tubular portion 36 of the connecting element 30, said portion 36 being provided with the cutting member. Thus, the intermediate part 37 forms a sleeve, which comprises at least one internal and annular sealing member 55 adapted to seal against the exterior of the tube portion 36 of the connecting element. The sealing members 55 suitably have the character of O-rings or the like, disposed in groves in the internal wall of the tube piece 54. It is preferred that these sealing members 55 are appreciably axially separated from each other. More specifically, one of the sealing members is located relatively close to the connecting tube piece 34 of the container 3, as viewed when the sleeve 37 is placed on the container 3, whereas the second sealing member will be located at the extreme end of the tube piece 54.

When the conduit 6 is to be connected to the container 3, the transport cover 33 is removed and instead the intermediate part or sleeve 37 is applied. The connecting element 30 is then manoeuvered so that its tubular portion 36 enters into the tube piece 54 and finally cuts through the closure 32 by means of the cutting member 31 located at the extreme end of the tube portion 36.

At least one of the sealing members 55 is located on the intermediate part 37 such that the tube portion 36 of the connection element enters into sealing co-operation with the connecting member in question before the cutting member 31 of the tube portion cuts through the closure 32.

In FIGS. 6 and 7 there is illustrated an example on the design of the dispensing unit 1. The flexible tube 5 has such a diameter and such a length that it becomes possible to comfortably grip with the hand and possible to squeeze together in the way which is diagrammatically indicated in FIG. 7. The tube 5 can at the top be connected in a suitable way known per se, e.g. by means of a clamping ring 39, to a connection piece 38, which presents a tube piece, on which the conduit end 28 is threaded. At the opposite end of the tube 5, there is also a piece 40 connected to the tube 5, said piece forming at its lower end the discharge opening 4. The valve arrangement 2 is arranged at the lower part of the tube 5 and as close to the discharge opening as possible.

The valve arrangement 2 has the character of a non-return valve designed to close a passage 41 between the interior of the tube 5 and the discharge opening 4 when the tube 5 is unaffected by the operator, but when the operator grips around the tube 5 and squeezes it together, the increase of pressure thereby arising causes a total pressure in the tube 5 composed, on one hand, by the pressure of the pump arrangement 7 and, on the other hand, by the pressure of the hand of the operator on the tube 5, and this total pressure is intended to be able to overcome the force from elastic return means 42, which tend to respectively hold the valve arrangement in and bring it back to a closing state. This, accordingly, gives rise to opening of the valve arrangement and the substance may consequently flow through towards the discharge opening 4.

In the example the valve arrangement 2 is formed by a ball valve, which presents a valve housing 43, in which the passage 41 is designed. Around the passage 41 the valve seat is formed, against which the ball 44 is intended to bear. The elastic return means 42 here have the character of a helical spring affecting the valve ball 44 to sealingly bear against the valve seat.

Figure 8:
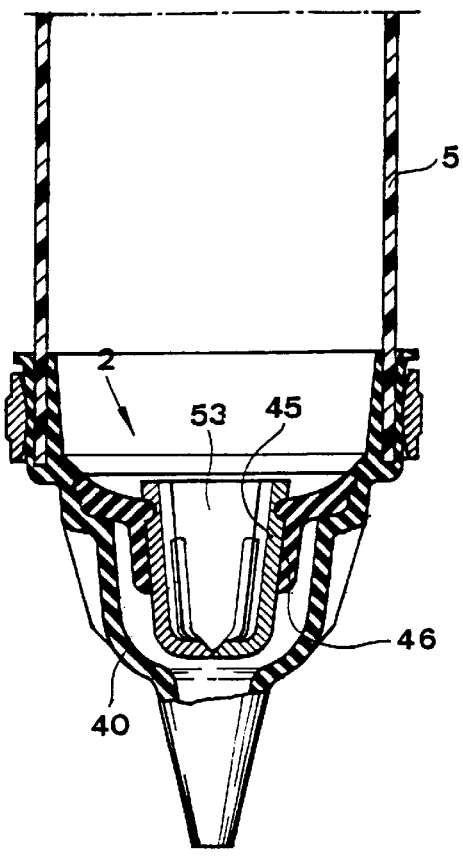
FIG. 8 is a view similar to the lower part of FIG. 6 but with a different valve arrangement.
Figure 9:
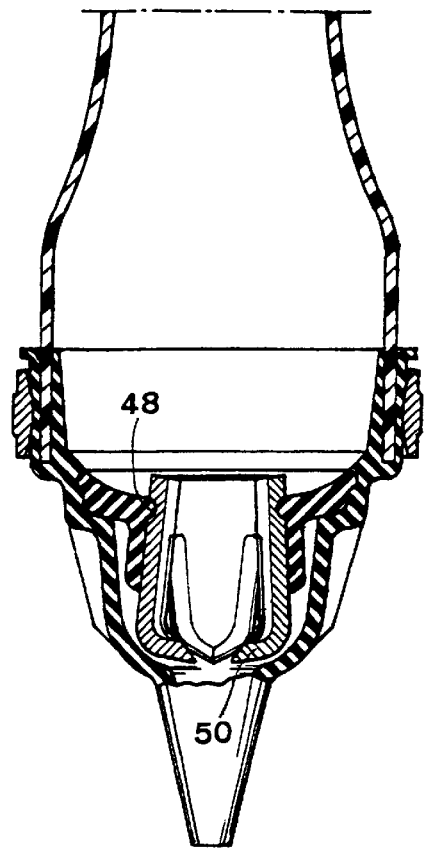
FIG. 9 is a view similar to FIG. 8 but with the tube compressed.
Figure 10:
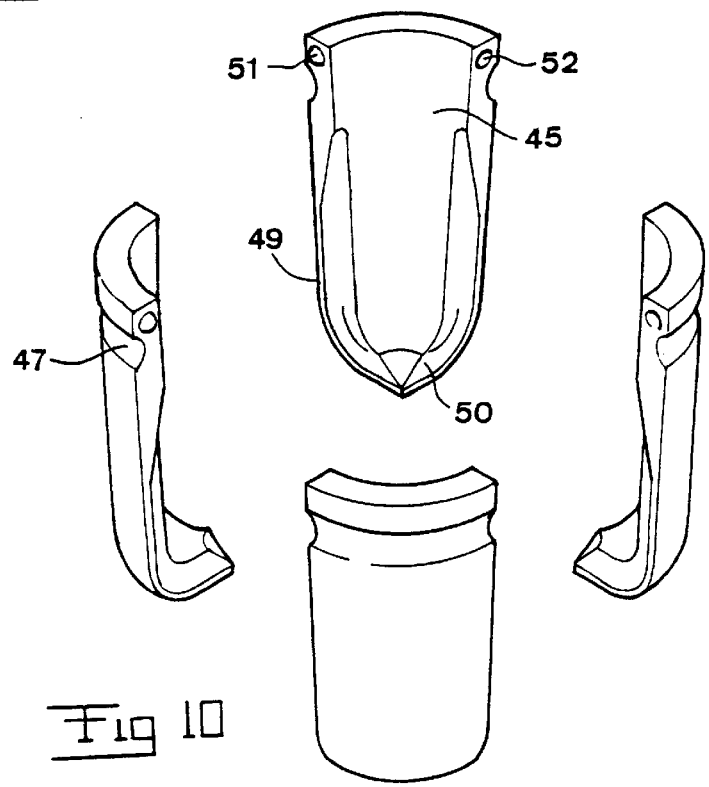
FIG. 10 is a perspective view illustrating the design of valve members included in the valve arrangement.

The variant illustrated in FIGS. 8–10 only differs from the one illustrated in FIGS. 6 and 7 concerning the design of the valve arrangement 2. Thus, the description will here be concentrated on the differences. In FIGS. 8–10 the valve arrangement 2 comprises a plurality of valve members 45, which are adapted to each other to, in a first relative state (FIG. 8), stop flow past the valve means and, in a second relative state (FIG. 9), open for such flow. In the example the valve members are four in number but this is not anything binding for the concept of the invention.

Elastic return means are provided for affecting the valve members 45 to closing position. These return means can for example be formed by an elastic member 46 extending around the valve members 45 and fastened in relation to the flexible tube 5 or the end piece 40.

The elastic member 46 around the valve members 45 has the character of a ring shaped sleeve, which grips around the valve members and squeezes them radially inwardly into bearing against each other. Accordingly, the elastic member 46 will counteract the valve means 45 or parts thereof from moving radially outwardly, i.e. away from each other.

As appears form the drawing figures, the elastic member 46 and the valve members 45 can present portions engaging with each other in order to obtain mutual determination of position. These portions have the character of projections/recesses. In the example recesses 47 (FIG. 10) are arranged on the valve members whereas on the elastic member 46 there is provided a protection 48 fitting into the recesses 47. The latter can for instance commonly form a circular groove, in which case the projection 48 on the elastic member 46 is formed by a ring-shaped bead extending inwardly.

The valve members 45 lie, in a closing position, against each other along bearing surfaces 49 and the valve members are arranged so as to rock, on opening, against each other, so that their ends 50 located downstream as seen in the discharge direction, move away from each other (see FIG. 9). The ends of the valve members located upstream are arranged to sidewardly bear against each other while the valve members rock in relation to each other.

As is indicated in FIG. 10 adjacent valve means 5 can engage with each other via form looking members, e.g. projections/pins 51 and recesses 52. According to a suitable embodiment, every single valve member 45 may present a pin 51 for engaging in adjacent valve members and furthermore a recess 52 intended to fit together with a pin of the other adjacent valve member.

The valve members 45 form in their closing position a cross sectionally generally circular configuration. Each single valve member forms a circle sector of this circular configuration.

In their closing position the valve members 45 commonly form a channel 53, which at the upstream ends of the valve members emerges into the tube 5 but which stops before the downstream ends 50 of the valve members, which ends in said closing position form a tight closure by bearing against each other. This channel 53 is, as is most clearly apparent from FIG. 10, formed by each one of the valve members comprising an inwardly located recess, which, however, stops before the lower ends of the valve members.

It is important that the valve members 45 are so designed, that over pressure in relation to the surroundings and present in the flexible tube 5 tends to affect the valve members in opening direction but that this affection is intended to be overcome by the elastic member 46 as long as the flexible tube 5 is not affected by the operator, i.e. that the elastic member 46 is capable of holding the valve arrangement 2 closed as long as it is the pump arrangement 7 which defines the pressure inside the tube 5. When, however, a pressure increase appears as the operator presses the tube 5 together, the effect of the member 46 is intended to be overcome, so that the valve arrangement opens by the valve members rocking or pivoting according to what is indicated in FIG. 9. When the affection on the tube 5 ceases, the member 46 brings back the valve members to closing position.

The elastic member 46 is secured to the flexible tube 5 or to the end piece 40 in an arbitrary way.

It appears from FIG. 1 that the container 3, which, in view of its bag-like character in the following will be denominated "bag", is suspended on a carrier generally denoted 56. The suspension device in general also comprises a carrying member 57 adapted to carryingly engage with an upper edge portion 58 of the bag 3 (see also FIGS. 11 and 12) in such a manner that the carrying forces are applied relatively evenly distributed along this upper edge portion of the bag. Furthermore, the carrier 56 comprises means 59, 60 for supporting the carrying member 57.

The carrying member 57 is designed as an elongated rod. The bag 3 comprises at its upper edge portion 58 a socket 61 for receiving the rod. This socket 61 is delimited by flexible material portions 62 included in the bag.

The interior of the socket 61 is separated from the interior 63 of the bag 3 intended for the flowing substance by means of a joint 64, in particular a weld, extending along the edge portion 58 of the bag, said joint uniting two material layers 65 included in the bag.

In practice it is preferred that the bag 3 is formed by two material layers 65 and 62 respectively laid on each other and that these material layers are mutually connected by the joint or weld 64 already mentioned and also by an upper joint or weld 66 along the uppermost edge of the bag and in addition also by means of joints or welds 67, 68 along the rest of the peripherical circumference of the bag.

The socket 61 must of course be open at its ends and for this purpose one or both of said material layers 62 is/are cut out so that the rod 57 may be threaded into the socket 61 and pass entirely through the same, so that the end portions of the rod project outwardly beyond the ends of the socket 61 as appears in FIG. 1 by means of the numbers 69 and 70 respectively denoting the ends of the rods.

The carrier 56 comprises support members for the end portions of the rod 57. These support members are formed by the previously mentioned means 59 and 60 respectively. The support member 59 may for example define an opening, through which the end 69 of the rod 57 is intended to be moved whereas the other support member 60 may have the character of a hook, on which the other end 70 of the rod 57 is placable.

The rod 57 and carrier 56 are designed to interact for restricting movement of the rod in its longitudinal direction relative to the carrier 56 when the rod is placed on the carrier. These restriction means may in a simple embodiment be formed by a circumferencial groove 71 in the rod 57. This groove 71 should have such a width that the support member or hook 60 may be received in the groove in order to achieve the restriction of movement.

As appears form FIG. 1, the rod 57 introduced into the socket 61 will carry the bag 3 along its upper edge portion in a relatively even manner, so that the bag during the entire discharge phase is present in an adequate position and will not hang down more or less obliquely, which could jeopardise the adequacy of the substance discharge.

Furthermore, the carrier 56 comprises carrying elements 72 for carrying the pump arrangement 7. In FIG. 1 the pump arrangement 7 is illustrated secured to these carrying elements by means of screws or similar 73 passing through the housing of the pump arrangement and holes provided in the carrying elements 72. These carrying elements 72 are, more specifically, so located on the carrier 56 that the pump arrangement 7 becomes located in front of the bag 3. As appears from FIG. 11 the carrying elements 72 extend forwardly from a rear frame of the carrier 56. In practice the bag 3 will be located between this rear frame and the pump arrangement 7. From this follows that the carrying element 72 will extend above the upper edge portion of the bag 3.

That part of the conduit 6 which is intended for connection between the bag 3 and the pump arrangement 7 will extend, as appears from FIG. 1, downwardly from the pump arrangement 7 to the discharge opening or connecting tube piece 34 of the bag. It is desirable that the length of the conduit between the pump arrangement 7 and discharge opening of the bag is as short as possible. On the other hand the length should be sufficient for convenient connection of the conduit to the bag by bending the flexible conduit. The location of the pump arrangement 7 relative to the bag defined by the design of the carrier 56 becomes very practical in this way if the pump arrangement is located in front of the bag in the area of its upper part, as viewed when the bag is suspended in the carrier.

When the bag is full as in FIG. 11 its sides will bulge out so that the connecting tube piece 34 will be directed somewhat obliquely downwardly as indicated in FIG. 5. In adaptation thereto, the connecting element 30 has been designed so that the angle between its tube portions 35 and 36 is so much smaller than a right angle that the tube portion 36 will extend substantially coaxially with the tube piece 54 of the intermediate part 37 assuming of course that the conduit section between the pump arrangement 7 and the connecting tube piece 34 has an adequately adjusted length. In this way the coupling of the conduit 6 to the bag 3 is considerably simplified.

The carrier 56 is as indicated in FIG. 11 attachable to a guide arrangement 73 allowing transverse displacement generally along the rod 57 (as viewed in its position located on the carrier 56). This guide arrangement may for example comprise two guide elements 74, each comprising a base part 75 to be secured to a suitable basis, for instance by means of securing members such as screws or the like, passing through holes 76 in the base part. Each guide element 74 comprises at least two parts guidedly displaceably movable relative to each other, namely in addition to the base part 75 at least one further part 77 (in the example there is a third intermediate part 78). The part 77 and the carrier 56 comprise co-operating engagement members 79 for attaching or suspending the carrier 56 on the parts 77. These engagement members may for instance have the character of hooks or latches, one embodiment possibility being to provide hooks on respective parts 77, on which hooks portions of the carrier 56 are intended to be hooked-on. The attachment may of course also occur by means of screws or other suitable securing means.

The guide arrangement 73 makes the carrier 56 with appendant bag 3 and pump arrangement 7 to be displaceable back and forth in a direction which is generally parallel to the longitudinal direction of the rod 57 when the rod is placed on the carrier 56. This displaceability may generally speaking serve for enabling movement of the carrier 56 between a normal, retracted operational position and a projected position, for instance for change of bag 3. A preferable example on an installation is that the base parts 75 could be secured to the inner wall in a cabinet so that the carrier 56 in one position would be intended to be located within the cabinet and in an other position be drawn out of the same for change of bag.

It is evident that the invention in no way is restricted only to the embodiment described, but that many modifications are possible within the scope of the invention.

I claim:

1. A device for dispensing flowing substances, comprising a container, a valve arrangement, a conduit extending between said container and said valve arrangement, said conduit comprising, at an end intended for connection to the container, a cutting member adapted to cut through a closure arranged on the container, and a sleeve securable to the container, the sleeve including at lest one internal and annular sealing member adapted to seal against the exterior of a tubular portion, which extends through the sleeve and at one end of which the cutting member is arranged.

2. A device according to claim 1, wherein at least two sealing member are provided and said at least two sealing members are axially separated from each other.

3. A device according to claim 2, wherein one of the at least two sealing members is located adjacent to a connecting tube piece of the container, as viewed when the sleeve is placed on the container, whereas a second of the at least two sealing members is located at an extreme end of a tube piece included in the sleeve.

4. A device according to claim 1, wherein said at least one sealing member has the character of an O-ring arranged in a groove in an internal wall of a tube piece included in the sleeve.

* * * * *